(12) United States Patent
Saltsidis et al.

(10) Patent No.: US 8,441,921 B2
(45) Date of Patent: *May 14, 2013

(54) SYSTEM AND METHOD FOR ETHERNET PROTECTION SWITCHING IN A PROVIDER BACKBONE BRIDGING TRAFFIC ENGINEERING DOMAIN

(75) Inventors: Panagiotis Saltsidis, Stockholm (SE); Martin Julien, Laval (CA); Sylvain Monette, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,659

(22) Filed: Feb. 27, 2012

(65) Prior Publication Data

US 2012/0207014 A1 Aug. 16, 2012

Related U.S. Application Data

(63) Continuation of application No. 12/441,440, filed as application No. PCT/IB2008/002936 on Oct. 31, 2008, now Pat. No. 8,144,576.

(60) Provisional application No. 60/984,892, filed on Nov. 2, 2007.

(51) Int. Cl.
*G01R 31/08* (2006.01)

(52) U.S. Cl.
USPC ............................ 370/217; 370/228; 370/221

(58) Field of Classification Search ...................... None
See application file for complete search history.

(56) References Cited

U.S. PATENT DOCUMENTS

| 7,889,754 | B2 * | 2/2011 | Dec et al. ....................... 370/432 |
| 2008/0170583 | A1 * | 7/2008 | Sultan et al. ................... 370/422 |
| 2008/0186865 | A1 * | 8/2008 | Yong et al. ..................... 370/244 |
| 2008/0281987 | A1 * | 11/2008 | Skalecki et al. ............... 709/253 |
| 2009/0073988 | A1 * | 3/2009 | Ghodrat et al. .......... 370/395.53 |
| 2010/0172238 | A1 | 7/2010 | Saltsidis et al. |

* cited by examiner

*Primary Examiner* — Kibrom T Hailu

(57) ABSTRACT

A method of providing protection switching on a backbone network includes configuring a service instance table for a first port of a first bridge. The service instance table includes a Virtual Local Access Network (VLAN) identifier entry for one or more service instances. The method also includes mapping data traffic received at the first bridge onto a first trunk by setting a VLAN identifier entry for a first service instance and transmitting data traffic to a second bridge on the first trunk in accordance with the mapping and monitoring the first trunk for faults by exchanging continuity check messages with the second bridge over the first trunk. The method additionally includes, upon detecting a fault, remapping data traffic for the first service instance by changing the VLAN identifier entry for the first service instance and transmitting data traffic to the second bridge in accordance with the remapping.

14 Claims, 6 Drawing Sheets

SYSTEM AND METHOD FOR ETHERNET PROTECTION SWITCHING IN A PROVIDER BACKBONE BRIDGING TRAFFIC ENGINEERING DOMAIN

CLAIMING BENEFIT OF PRIOR FILED U.S. APPLICATION

This application is a continuation of International Application PCT/IB2008/002936, with an international filing date of Oct. 31, 2008, which corresponds to the national-stage entry U.S. patent application Ser. No. 12/441,440, filed Dec. 8, 2009 now U.S. Pat. No. 8,144,576 and which claims the benefit of U.S. Provisional Application No. 60/984892, filed Nov. 2, 2007, and the contents of all of the preceding are hereby incorporated by reference herein.

TECHNICAL FIELD

The present invention relates generally to communications networks, and in particular, to communications networks that employ systems and methods of Ethernet protection switching in a Provider Backbone Bridging Traffic Engineering (PBB-TE) domain.

BACKGROUND OF THE INVENTION

Over the past few years, Ethernet has become the undisputed leading Local Area Network (LAN) technology due to the intrinsic characteristics of the technology, such as being simple to implement and use, cheap to employ, easy to manage, and backward compatible.

With data services now accounting for the bulk of traffic, telecommunication operators and carriers are looking at the possibility of reaping the same benefits by replacing their Synchronous Digital Hierarchy (SDH)/Synchronous Optical Networking (SON ET) infrastructure with an Ethernet-based packet transport infrastructure. However, metro and backbone networks have quite different requirements than enterprise LANs.

Consequently, Ethernet technology requires specific enhancements if it is to fulfill these carrier-grade requirements. Currently, work is being carried out at the Institute of Electrical and Electronics Engineers (IEEE) on the Provider Backbone Bridge Traffic Engineering (PBB-TE) concept, to implement Ethernet technology for carrier use. There is an amendment to the IEEEE P802.1Q standard being discussed (IEEE P802.1Q-2006/D0.1, Draft IEEE Standard for Local and Metropolitan Area Networks: Virtual Bridged Local Area Networks), which is intended to provide a true carrier-grade packet transport solution based on Ethernet.

PBB-TE (i.e. IEEE 802.1Qay/D0.0, Draft Standard for Local and Metropolitan Area Networks-Virtual Bridged Local Area Networks: Provider Backbone Bridges—Traffic Engineering, May 2007) proposes a simple, connection-oriented solution. This implementation maintains the inherent advantages of Ethernet, while addressing the deficiencies of Ethernet as a carrier-class packet transport protocol. It builds upon the concepts brought forth in the amendments to IEEE 802.1Q and, in particular, the network separation of PBB (i.e., IEEE 802.1Qah/D3.8, Draft Standard for Local Metropolitan Area Networks—Virtual Bridged Local Area Networks: Provider Backbone Bridges, October 2007) to provide a scalable solution.

In contrast to Provider Backbone Bridging (PBB), spanning tree protocols and broadcasting/flooding are not used in PRB-TE. Filtering databases are populated using a network management system or an enhanced control plane, allowing Ethernet Switched Paths (ESPs) to be engineered and provisioned across the network. This allows control of traffic flow through the Ethernet-based packet transport network which ensures an optimal allocation of resources. Each ESP represents a unidirectional path. A pair of ESPs that form a bidirectional path across the network defines a PBB-TE trunk or tunnel.

One of the key points addressed in PBB-TE is how to provide end-to-end linear protection for PBB-TE trunks, where a dedicated protection PBB-TE trunk is established for a particular trunk, and the traffic is automatically switched from the working (primary) PBB-TE trunk to the protection (backup) PBB-TE trunk when a failure occurs on the primary trunk.

FIG. 1 is a simplified block diagram illustrating essential elements of an end-to-end linear protection scheme 10 and its arrangement in existing networks for a protection entity 12. The scheme employs normal traffic over an ESP 14 as a working entity and an ESP 16 as a protection entity between a West component 18 and an East component 20. The West component includes a protection switching process 22 and the East component includes a protection switching process 24. At the sending ends, traffic may be arranged in two ways. First, in a 1+1 arrangement, traffic is sent on both the working and protection paths simultaneously (bridged). Second, in a 1:1 or 1 for 1 arrangement, traffic is sent on only one of the paths at any point in time (switched). In both protection arrangements the receiving end selects traffic from the working or protection entities based on information from Operations, Administration and Management (OAM) processes or network operators. In the 1 for 1 case, the sending "protection bridge" and receiving "selector" must be coordinated.

International Telecommunication Union-Telecommunication (ITU-T) defines the term "bridge" for the switch that selects either or both of the transmit paths at the sending end of a protection domain. It should be understood that this is not the same definition as the term "bridge" utilized in the IEEE 802 standard. As defined in the present invention, the ITU-T linear protection bridge refers to a "protection bridge".

In unidirectional linear protection schemes, the selectors at each end of the protection domain operate asynchronously. Specifically, a traffic path selection action at one end does not result in a traffic selection action at the other end on traffic in the reverse direction. Consequently, traffic in one direction may use a different path from the traffic in the other direction.

However, bidirectional linear protection schemes operate synchronously in the sense that a traffic selection action at one end also triggers a corresponding selection action at the other end on traffic in the reverse direction. Thus, traffic in both directions share the same path (i.e., either working or protection).

Protection switching may be triggered by OAM information arising from periodic monitoring of the working and protection paths or from physical layer monitoring, such as loss of signal or frame errors detected through frame check sequence.

Linear protection schemes are usually configurable to be "revertive" or "non-revertive", where reception and transmission traffic, where applicable reverts, to the working path automatically once OAM indicates the fault or defect has cleared.

Most linear protection schemes now aim to switch completely (both ends where appropriate) in less than 50 ms from the occurrence of the fault, not just from the OAM defect indication. Consequently, the periodicity of OAM continuity check messages has to be nearly an order faster to detect the fault and transport the synchronization information end to end.

Most schemes also incorporate hold-off and wait to restore timers. Hold-off times ensure the fault is not just a transient event, arising from some lower level protection switching for instance, while restore times ensures the performance of the working path is fully restored before switching back to it. Obviously, the overall recovery time is greater.

Thus, a scalable end-to-end sub-50 ms resiliency mechanism that offers bidirectional end-to-end linear protection capabilities for point-to-point PBB-TE tunnels or trunks in a PBB-TE domain is needed.

Today, different proprietary and standard based resiliency mechanisms are used within Ethernet networks, such as Spanning Tree Protocol (STP), Rapid Spanning Tree Protocol (RSTP), Multiple Spanning Tree Protocol (MSTP), Resilient Packet Ring (RPR), and Link Aggregation (LAG). However, these mechanisms are limited to link failures and are not designed to easily scale in large networks. Furthermore, they do not support sub-50 ms protection switching in either a ring or linear environment. In addition, since spanning tree protocols are not used in PBB-TE, this also excludes their use from the onset as a potential solution for offering PBB-TE trunk resiliency.

In SDH/SONET networks, the Automatic Protection Switching (APS) function and protocol provides end-to-end circuit protection. This APS function and protocol can support 50 ms switchover, unidirectional and bi-directional switchover, revertive and non-revertive switchover, manual, and/or automatic switchover. The APS function may also support linear, ring, and mesh topologies. APS enables the switchover of circuits in case of circuit failure and is utilized in most synchronous networks.

ITU-T, through the G.8031/Y.1342 Recommendation, defines the use of the APS function and protocol for point-to-point VLAN-based subnetwork connection in Ethernet transport networks. The APS protocol is used to co-ordinate the two ends of a protection domain. APS messages are only sent on the protection path. Direct application of the G.8031 mechanisms on in a PBB-TE domain introduces additional complexity as the advent of the APS Protocol Data Unit (PDU) for signaling purposes contains substantial redundant information leading to a non-cost efficient solution.

For example, the G.8031 Recommendation states it is desirable for Continuity Check Messages (CCMs) to be sent with an interval of 3.3 ms and for the first three APS messages (resulting from a protection switch event at the originating end) to also be sent with a similar interval of 3.3 ms and then again with an interval of 5 seconds. This permits the loss of up to two APS messages due to errors or other phenomena while still achieving a 50 ms protection switch time.

SUMMARY OF THE INVENTION

There is a need in the art or APS functionality in a PBB-TE domain for a simpler and more efficient bidirectional end-to-end linear protection switching mechanism. The present invention is intended for solutions addressing this need. A much simpler solution based on the exchange of CCMs and the use of the Remote Defect Indicator (RDI) for APS signaling is provided in the present invention.

The present invention provides a 1:1 bidirectional linear protection switching capability in a PBB-TE domain leveraging on the existing IEEE 802.1Qag Connectivity Fault Management (CFM). CCMs, and RDI field. The present invention also provides a simplified and efficient solution, which is well aligned to employ Ethernet technology.

Thus, in one embodiment; the present invention is directed to a method of providing Ethernet protection switching in a PBB-TE Domain. The method begins by establishing two PBB-TE trunks between a first B-component and a second B-component. Each trunk includes two unidirectional Ethernet Switching Paths (ESPs), each associated with a possibly different VLAN Identifier (VID). The method includes mapping data traffic onto the first PBB-TE trunk, where the first PBB-TE trunk corresponds to a working entity and the second PBB-TE trunk corresponding to a backup protection entity. Data traffic is sent on the first trunk via an ESP associated with one VID in one direction and another ESP associated with a possibly different VID in the opposite direction. The PBB-TE trunks are monitored for faults. Upon detecting a fault on one PBB-TE trunk, data traffic is remapped onto the other PBB-TE trunk via a third ESP associated with a third VID and a fourth ESP associated with a fourth VID.

In another embodiment, the present invention is directed to a system for providing Ethernet protection switching in a PBB-TE Domain. The system includes a first PBB-TE trunk between a first B-component and a second B-component, the first PBB-TE trunk having a first ESP for unidirectional traffic from the first B-component to the second B-component and a second ESP for unidirectional traffic from the second B-component to the first B-component. The first ESP is associated with a first VID and the second ESP is associated with a second VID. The system also includes a second PBB-TE trunk between the first B-component and the second B-component. The second PBB-TE has a third ESP for unidirectional traffic from the first B-component to the second B-component and a fourth ESP for unidirectional traffic from the second B-component to the first B-component. The third ESP is associated with a third VID and the fourth ESP is associated with a fourth VID. In addition, the system maps data traffic onto the first PBB-TE trunk where the first PBB-TE trunk corresponds to a working entity and the second PBB-TE trunk corresponds to a backup protection entity. The two PBB-TE trunks are monitored for faults. Upon detecting a fault on one PBB-TE trunk, data traffic is remapped onto the other PBB-TE trunk.

In still another embodiment, the present invention is directed to a node for providing Ethernet protection switching in a PBB-TE Domain. The node connects to a first PBB-TE trunk between the node and a second node. The first PBB-TE trunk has a first ESP for unidirectional traffic from the node to the second node and a second ESP for unidirectional traffic from the second node to the node. The first ESP is associated with a first VID and the second ESP is associated with a second VID. The node also connects to a second PBB-TE trunk between the node and the second node. The second PBB-TE trunk has a third ESP for unidirectional traffic from the node to the second node and a fourth ESP for unidirectional traffic from the second node to the node. The third ESP is associated with a third VID and the fourth ESP is associated with a fourth VID. The node maps data traffic onto the first PBB-TE trunk. The first PBB-TE trunk corresponds to a working entity and the second PBB-TE trunk corresponds to a backup protection entity. The two PBB-TE trunks are monitored for faults. Upon detecting a fault on one PBB-TE trunk, the node remaps data traffic onto the other PBB-TE trunk.

DETAILED DESCRIPTION OF PREFERRED EMBODIMENTS

The present invention is a system and method for Ethernet protection switching in a PBB-TE domain. The present invention provides a 1:1 bidirectional linear protection switching capabilities in a PBB-TE domain. In a ABB-TE domain, Backbone Edge Bridges (BEBs) mark the demarcation between the Provider Backbone Bridged Network (PBBN) of interest and the networks attached to it. These BEBs are assumed to be B-BEBs or IB-BEBs each containing a B-Component. The protection domain is defined to be the area between the Customer Backbone Ports (CBPs) on the different B-Components of the involved BEBs. ESPs are provisioned from one BEB to the other, each one identified by the tuple <B-DA, B-SA, B-VID>. Each ESP represents a unidirectional path and the ESP pairs that form the bidirectional path define a PBB-TE trunk. The ESPs belonging to the same PBB-TE trunk are co-routed, but may also be identified by different B-VIDs.

Figure 1:
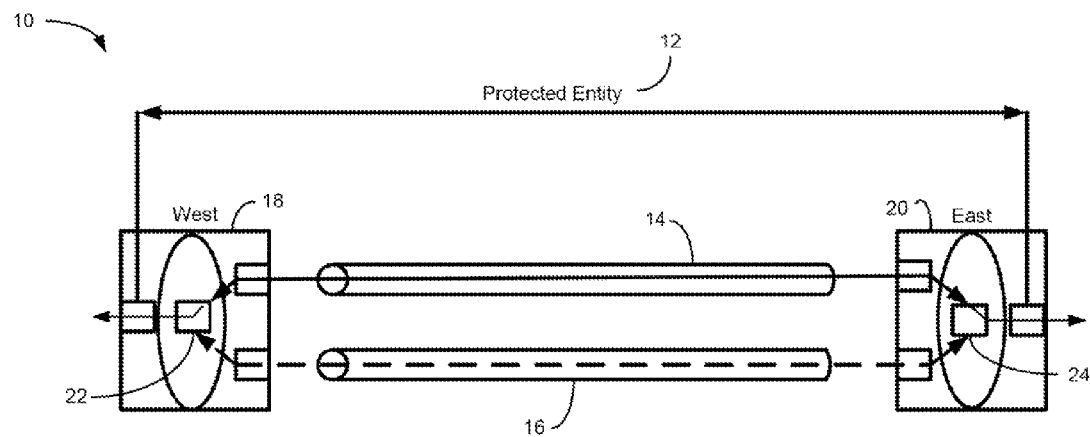
FIG. 1 (prior art) is a simplified block diagram illustrating essential elements of an end-to-end linear protection scheme and its arrangement in existing networks for a protection entity.
Figure 2:
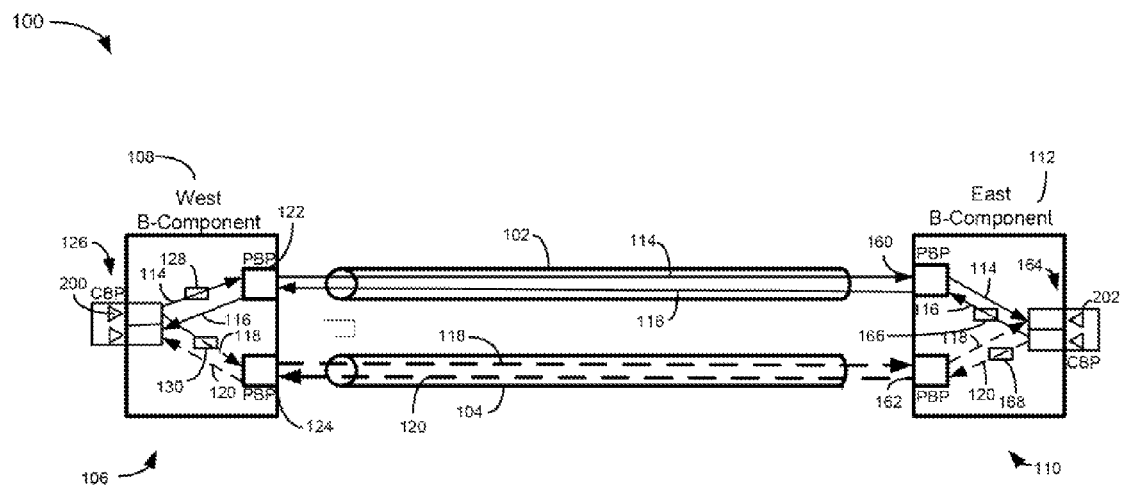
FIG. 2 is a simplified block diagram of a network illustrating PBB-TE trunk setup in the preferred embodiment of the present invention.

FIG. 2 is a simplified block diagram of a network 100 illustrating PBB-TE trunk setup in the preferred embodiment of the present invention. The network 100 includes at least two PBB-TE trunks, PBB TE (Working Entity) trunk 102 and PBB-TE (Protection Entity) trunk 104, between a BEB 106 having West B-Component 108 and a BEB 110 having an East B-Component 112. The ABB-TE trunk 102 includes a West to East ESP 114 and an East to West ESP 116. Each ESP may correspond to the same or different B-VID settings for the two different directions. The PBB-TE trunk 104 includes a West to East ESP 118 and an East to West ESP 120.

The ESPs 114, 116, 118, and 120 are set by configuring entries in the filtering databases (FDBs) on all the bridges that these ESPs need to pass through and the VLAN membership of each participating port has to be set. There are two B-Components terminating the ESPs. As depicted in FIG. 2, the West B-Component 108 includes a Customer Backbone Port (CBP) 126 and a number of Provider Network Ports (PNPs), PNP 122, and PNP 124. The East B-Component 112 includes a CBP 164, and a number of PNPs, PNP 160 and PNP 162. The ESP 114 associated with VID 128 is part of the Working Entity 102 and is configured between CBP 126 and CBP 164. In addition, there is another ESP 118, associated with VID 130, which is part of the Protection Entity 104 and is configured between the CBP 126 and the CBP 164. Since ESP 114 is associated with VID 128, ports CAP 126 and PNP 122 on the West. B-component 108 and ports PNP 160 and CPB 164 on the East B-Component 112 are configured to be members of the VID 128 member set. Since ESP 118 is associated with VID 130, ports CBP 126 and PNP 124 on the West B-component 108 and ports PNP 162 and CPB 164 on the East B-Component 112 are configured to be members of the VID 130 member set. In the opposite direction from the East B-component 112 to the West B-component 108, there is the ESP 116 associated with VID 166 which is part of the Working Entity 102 and is configured between CBP 164 and CBP 126 and a fourth ESP 120, associated with VID 168, which is part of the Protection Entity 104 and is configured between the CBP 164 and the CBP 126. Since the ESP 116 is associated with VID 166, ports CBP 126 and PNP 122 on the West B-component 108 and ports PNP 160 and CPB 164 on the East B-Component 112 are configured to be members of the VID 166 member set. Since ESP 120 is associated with VID 168, ports CBP 126 and PNP 124 on the West B-component 108 and ports PNP 162 and CPB 164 on the East B-Component 112 are configured to be members of the VID 168 member set. Frames are tagged for a specific VID and may only egress or ingress with associated ports.

Configuring the PBB-TE trunks means that the corresponding Maintenance Associations (MAs) are configured as well. One MA is set to monitor the top (trunk-1) PBB-TE trunk and a second to monitor the bottom (trunk-2) PBB-TE. Each of these two MAs may be associated with a pair of Virtual LAN Identifiers (VIDs), where each VID corresponds to one unidirectional ESP. The MA that monitors the PBB-TE trunk-1 may then contain both the VIDs in its VID list. The Maintenance End Points (MEPs), associated with this MA are Up MEPs, configured on the CBPs that demark the associated PBB-TE trunk. For example, where two VIDs are used for one PBB-TE trunk, each of the MEPs has its own primary VID (e.g., VID 128 for the MEP on the West B-component associated with the PBB-TE trunk 102, and VID 166 for the MEP on the East B-component). In this configuration, each MEP may receive frames that are tagged with any of the VIDs in the MA list, but send frames that are tagged only with that MEP's primary VID. In particular, in the depicted example, the MEP for the working entity on the West B-component may send only specified VID 128 tagged Continuity Check Messages (CCMs) while the corresponding MEP on the East component may only send VID 166 tagged frames. Roth MEPs may receive CCM frames that are tagged for either VID 166 or 128.

Figure 3:
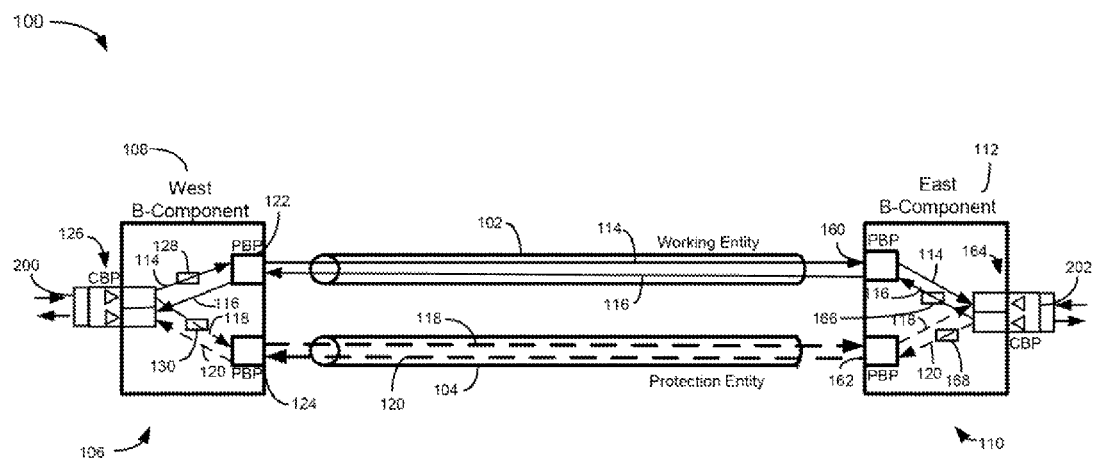
FIG. 3 is a simplified block diagram illustrating mapping of specific data traffic to a working entity in the network of FIG. 2.

Data traffic is mapped to a PBB-TE trunk by configuring the CBP parameters. In particular, the CBP backbone instance service identifier is used to allow only specific service instances to be carried by the PBB-TE trunk and the B-VID column on the Backbone Service Instance table or, if this is not supported, the CBP's Port VID (PVID) parameter may be used to map the identified service instances to a specific ESP. FIG. 3 is a simplified block diagram illustrating mapping of specific data traffic to a working entity in the network 100 of FIG. 2. The CBP's PVID value for the CBP 126 is associated with VID 128, while the CBP 164 is associated with the VID 166. As depicted, the network includes an MEP 200 associated with VID 128 on the West B-Component 108 and a MEP 202 associated with the VID 166 on the East B-Component 112.

As a result of this configuration, frames of specific Backbone Service Instance Identifier (1-SID) values that reach the CBP on the West B-component 108 are mapped to the ESP 114, while specific frames that reach the CBP on the East B-component 112 are mapped on the ESP 116. Thus, the ABB-TE trunk 102 corresponds to the working entity and PBB-TE trunk 104 corresponds to a stand-by protection entity. Without regard to how the data traffic is mapped to the ABS-TE trunks, CCM frames are exchanged on both the working and protected entities in order to regularly check the provided connectivity.

Figure 4:
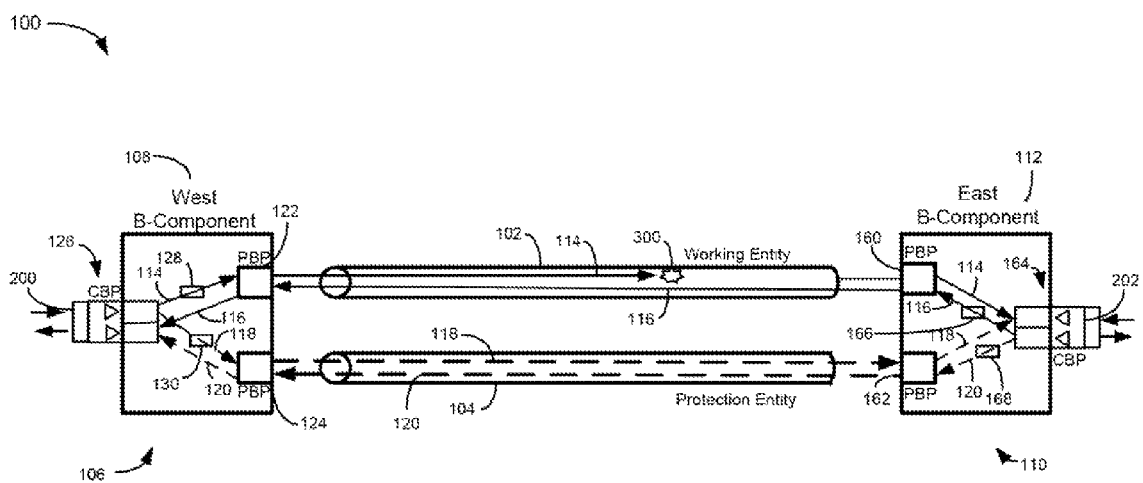
FIG. 4 is a simplified block diagram illustrating a fault in a working entity of the network of FIG. 2.

FIG. 4 is a simplified block diagram illustrating a fault in a working entity of the network 100 of FIG. 2. If a fault occurs at any of the ESPs, the MEP on the receiving end is notified. For example, if a fault 300 on the ESP 114 occurs, the MEP 202 on the East B-component 112 declares a remote MEP defect by setting an rMEPCCMdefect parameter. The timer counter for timing out CCMs has a granularity finer than or equal to ¼ of the time represented by the CCMinterval variable (the configured time between CCM transmissions). A Bridge does not set rMEPCCMdefect within (3.25*CCMinterval seconds of the receipt of a CCM, and sets rMEPCCMdefect within (3.5*CCMinterval) seconds after the receipt of the last CCM. The setting of the rMEPCCMdefect parameter results in a change of the PVID parameter of the CBP to VID 168, which is the BVID of the associated provisioned ESP on the protection PBB-TE trunk 104 (the PVID parameter also changes when the xConCCMdefect or the errorCCMdefect parameters are set as these indicate a very serious misconfiguration problem). All subsequent CCMs sent via the MEP associated with the VID 166 have their RDI field set (for as long as proper CCMs are not received by the MEP).

Figure 5:
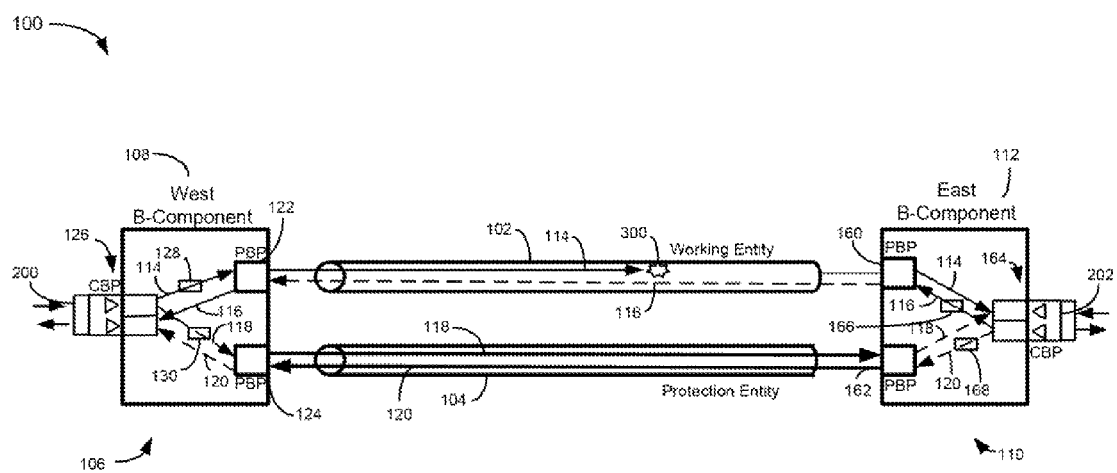
FIG. 5 is a simplified block diagram of the network illustrating remapping of specific data traffic to the protection entity.

FIG. 5 is a simplified block diagram of the network 100 illustrating remapping of specific data traffic to the protection entity. Reception of a CCM frame with the RDI field set (or an event that causes setting of the someRMEPCCMdefect, xConCCMdefect, or errorCCMdefect) causes the associated B-VID entry in the Backbone Service Instance table to change to the preconfigured value of the protection ESP (i.e., associating with the ESP 118 and corresponding VID 130). Alternatively, if the B-VID column is not supported, the PVID parameter of the CBP 126 on the West B-component 108 is changed to the preconfigured value of the protection ESP. This results in moving the specific service instance to the protection PBB-TE trunk 104 as depicted in FIG. 5.

Figure 6:
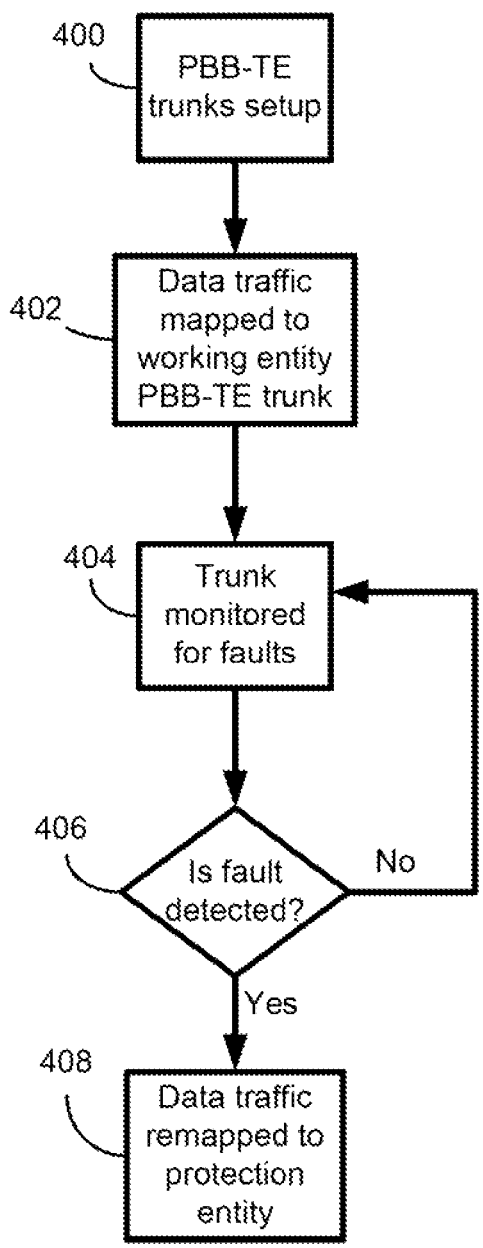
FIG. 6 is a flow chart illustrating the steps of setting up and mapping PBB-TE trunks to provide protection switching capabilities in a PBB-TE domain.

FIG. 6 is a flow chart illustrating the steps of setting up and mapping PBB-TE trunks to provide protection switching capabilities in a PBB-TE domain. With reference to FIGS. 2-6, the method will now be explained. In step 400, the PBB-TE trunks are set up. The PBB-TE trunk 102 is established as the working entity and includes the ESP 114 associated with the VID 128 in one direction (i.e., west to east) and the ESP 116 associated with the VID 166 in another direction (i.e., east to west). The PBB-TE trunk 104 is established as the protection entity and includes the ESP 118 associated with the VID 130 in one direction (i.e., west to east) and the ESP 120 associated with the VID 168 in another direction (i.e., east to west). Next, in step 402, data traffic is mapped to the specified PBB-TE trunk (i.e., PBB-TE trunk 102) by configuring the CBP parameters. In particular, the CBP backbone instance service identifier is used to allow only specific service instances to be carried by the PBB-TE trunk while the CBP's B-VID column in their Backbone Service Instance tables. Alternatively, if this is not supported, the Port VID (PVID) parameter may be used to map the identified service instances to a specific ESP. The CBP's PVID or B-VID value for the CBP 126 is associated with the VID 128 while the CBP 164 is associated with the VID 166. As a result of this configuration, frames of specific I-SID values that reach the CBP on the West B-component 108 are mapped to the ESP 114, while specific frames that reach the CBP on the East B-component 112 are mapped on the ESP 116. Thus, the PBB-TE trunk 102 corresponds to the working entity and PBB-TE trunk 104 corresponds to a stand-by protection entity. Without regard to how the data traffic is mapped to the PBB-TE trunks, CCM frames are exchanged on both the working and protected entities in order to regularly check the provided connectivity.

The method then moves to step 404 where the trunks are monitored for faults. Next, in step 406, it is determined if a fault is detected. If a fault is not detected, the method continues to monitor the trunks in step 404. However, in step 406, if it is determined that a fault on the working entity is detected, the method moves to step 408 where data traffic is remapped to the protection entity. If a fault occurs at any of the ESPs, the MEP on the receiving end is notified. For example, if a fault 300 on the ESP 114 occurs, the MEP 202 on the East B-component 112 declares a remote MEP defect by setting an rMEPCCMdefect parameter. The timer counter for timing out CCMs has a granularity finer than or equal to ¼ of the time represented by the CCMinterval variable (the configured time between CCM transmissions). A Bridge does not set rMEPCCMdefect within (3.25*CCMinterval seconds of the receipt of a CCM, and sets rMEPCCMdefect within (3.5*CCM interval) seconds after the receipt of the last CCM. The setting of the rMEPCCMdefect parameter results in a change of the Backbone Service Instance table's B-VID column or the PVID parameter of the CBP to the VID 168, which is the BVID of the associated provisioned ESP on the protection PBB-TE trunk 104. All subsequent CCMs sent via the MEP associated with the VID 166 have a RDI field set (for as long as proper CCMs are not received by the MEP). A reception of a CCM frame with the RDI field set (or an event that causes setting of the someRMEPCCMdefect, xConCCMdefect or errorCCMdefect) causes a change of the Backbone Service Instance table's B-VID column value or the PVID parameter of the CBP 126 on the West B-component 108, to the preconfigured value of the protection ESP (i.e., associating with the ESP 118 and corresponding VID 130). This results in moving the specific service instance to the protection PBB-TE trunk 104.

The present invention provides a system and method offering a 1:1 bidirectional linear protection switching capability in a PBB-TE domain leveraging on the existing IEEE 802.1Qag Connectivity Fault Management (CFM), CCMs, and RDI field. The present invention also provides a simplified and efficient solution, which is well aligned with the intrinsic characteristics of Ethernet technology.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of providing protection switching on a backbone network, the method comprising:
configuring a service instance table for a first port of a first bridge connecting a backbone network to an external network, wherein the service instance table includes a Virtual Local Access Network (VLAN) identifier entry for each of one or more service instances on the backbone network supported by the first bridge;
mapping data traffic received at the first bridge from the external network onto a first trunk of the backbone network by setting a VLAN identifier entry for a first service instance in the service instance table to a value for a working entity VLAN that corresponds to the first trunk, wherein the first trunk comprises a pair of unidirectional paths connecting the first bridge to a second bridge on the backbone network;

transmitting data traffic received from the external network to the second bridge on the first trunk in accordance with the mapping;

monitoring the first trunk for faults by exchanging continuity check messages with the second bridge over the first trunk, wherein an indicator included in each of the continuity check messages indicates whether a fault has occurred on the first trunk;

upon detecting a fault on the first trunk, remapping data traffic for the first service instance from the first trunk onto a second trunk that connects the first bridge to the second bridge by changing the VLAN identifier entry for the first service instance from the value for the working entity VLAN to a value for a predetermined protection entity VLAN wherein the protection entity VLAN corresponds to the second trunk; and transmitting data traffic received from the external network to the second bridge on the second trunk in accordance with the remapping.

2. The method of claim 1, wherein each of the service instances supported by the first bridge is associated with a respective service instance identifier, and wherein the method further comprises:

receiving data traffic from the external network at the first bridge, wherein the received data traffic is identified by a first service instance identifier; and filtering the data traffic entering the backbone network at the first bridge based on one or more service instance identifier values configured for the first port.

3. The method of claim 1, further comprising:

monitoring the second trunk for faults by exchanging continuity check messages with the second bridge over the second trunk, wherein an indicator included in each of the continuity check messages indicates whether a fault has occurred on the second trunk;

upon detecting a fault on the second trunk, remapping data traffic for the first service instance from the second trunk back to the first trunk by changing the VLAN identifier entry for the first service instance; and transmitting data traffic received from the external network at the first bridge to the second bridge on the second trunk in accordance with the remapping.

4. The method of claim 1, wherein the first bridge includes a first egress port associated with a first VLAN identifier and a first ingress port associated with a second VLAN identifier, wherein the first egress port sends data traffic for the first service instance to the second bridge via a first path of the first trunk and the first ingress port receives data traffic for the first service instance from the second bridge via a second path of the first trunk.

5. The method of claim 4, wherein remapping data for the first service instance onto the second trunk includes reconfiguring the first egress port to send data traffic for the first service instance to the second bridge via a first path of the second trunk and reconfiguring the first ingress port to receive traffic for the first service instance from the second bridge via a second path of the second trunk.

6. The method of claim 1, further comprising:

establishing a first Maintenance Association (MA) between the first bridge and the second bridge and monitoring the first trunk for faults with the first MA; and establishing a second MA between the first bridge and the second bridge and monitoring the second trunk for faults with the second MA.

7. The method of claim 1, wherein the backbone network comprises a Provider Backbone Bridge Traffic Engineering (PBB-TE) network and the first bridge comprises a Backbone Edge Bridge (BEB).

8. An apparatus for providing protection switching in a backbone network, the apparatus comprising a first bridge that includes:

a first port configured to couple the first bridge to a first trunk in a backbone network, wherein the first trunk comprises a pair of unidirectional paths on the backbone network;

a second port configured to couple the first bridge to a second trunk in the backbone network, wherein the second trunk comprises a pair of unidirectional paths on the backbone network; and a third port configured to couple the first bridge to an external network and to receive data traffic from the external network, wherein the first bridge is configured to:

maintain a service instance table for a first port of a first bridge connecting a backbone network to an external network, wherein the service instance table includes a Virtual Local Access Network (VLAN) identifier entry for each of one or more service instances on the backbone network supported by the first bridge;

map data traffic received by the third port from the external network onto the first trunk by setting a VLAN identifier entry for a first service instance in the service instance table to a value for a working entity VLAN that corresponds to the first trunk;

transmit data traffic received by the third port from the external network to a second bridge on the first trunk in accordance with the mapping;

monitor the first trunk for faults by exchanging continuity check messages with the second bridge over the first trunk, wherein an indicator included in each of the continuity check messages indicates whether a fault has occurred on the first trunk;

upon detecting a fault on the first trunk, remap data traffic for the first service instance from the first trunk onto the second trunk by changing the VLAN identifier entry for the first service instance from the value for the working entity VLAN to a value for a predetermined protection entity VLAN, wherein the protection entity VLAN corresponds to the second trunk; and transmit data traffic received by the third port from the external network to the second bridge on the second trunk in accordance with the remapping.

9. The apparatus of claim 8, wherein each of the service instances supported by the first bridge is associated with a respective service instance identifier, and wherein the first bridge is further configured to:

receive data traffic from the external network at the third port, wherein the received data traffic is identified by a first service instance identifier; and filter the data traffic entering the backbone network at the first bridge based on one or more service instance identifier values configured for the first port.

10. The apparatus of claim 8, wherein the first bridge is further configured to:

monitor the second trunk for faults by exchanging continuity check messages with the second bridge over the second trunk, wherein an indicator included in each of the continuity check messages indicates whether a fault has occurred on the second trunk;

upon detecting a fault on the second trunk, remap data traffic for the first service instance from the second trunk back to the first trunk by changing the VLAN identifier entry for the first service instance; and transmit data traffic received by the third port from the external network to the second bridge on the second trunk in accordance with the remapping.

11. The apparatus of claim 8, wherein the first port comprises a first egress port associated with a first VLAN identifier and a first ingress port associated with a second VLAN identifier, wherein the first egress port is configured to send data traffic for the first service instance to the second bridge via a first path of the first trunk and the first ingress port is configured to receive data traffic for the first service instance from the second bridge via a second path of the first trunk.

12. The apparatus of claim 11, wherein the bridge is configured to remap data for the first service instance onto the second trunk by reconfiguring the first egress port to send data traffic for the first service instance to the second bridge via a first path of the second trunk and reconfiguring the first ingress port to receive traffic for the first service instance from the second bridge via a second path of the second trunk.

13. The apparatus of claim 8, wherein the first bridge is further configured to:

establish a first Maintenance Association (MA) between the first bridge and the second bridge to monitor the first trunk; and establish a second MA between the first bridge and the second bridge to monitor the second trunk for faults.

14. The apparatus of claim 8, wherein the first bridge comprises a Backbone Edge Bridge (BEB), and the first port and second port are configured to couple the BEB to trunks in a Provider Backbone Bridge Traffic Engineering (PBB-TE) network.

* * * * *

UNITED STATES PATENT AND TRADEMARK OFFICE
CERTIFICATE OF CORRECTION

PATENT NO. : 8,441,921 B2  
APPLICATION NO. : 13/405659  
DATED : May 14, 2013  
INVENTOR(S) : Saltsidis et al.

Page 1 of 2

It is certified that error appears in the above-identified patent and that said Letters Patent is hereby corrected as shown below:

In the Drawings:

In Fig. 2, Sheet 2 of 6, for Tag "122", delete "PBP" and insert -- PNP --, therefor.

In Fig. 2, Sheet 2 of 6, for Tag "124", delete "PBP" and insert -- PNP --, therefor.

In Fig. 2, Sheet 2 of 6, for Tag "160", delete "PBP" and insert -- PNP --, therefor.

In Fig. 2, Sheet 2 of 6, for Tag "162", delete "PBP" and insert -- PNP --, therefor.

In Fig. 3, Sheet 3 of 6, for Tag "122", delete "PBP" and insert -- PNP --, therefor.

In Fig. 3, Sheet 3 of 6, for Tag "124", delete "PBP" and insert -- PNP --, therefor.

In Fig. 3, Sheet 3 of 6, for Tag "160", delete "PBP" and insert -- PNP --, therefor.

In Fig. 3, Sheet 3 of 6, for Tag "162", delete "PBP" and insert -- PNP --, therefor.

In Fig. 4, Sheet 4 of 6, for Tag "122", delete "PBP" and insert -- PNP --, therefor.

In Fig. 4, Sheet 4 of 6, for Tag "124", delete "PBP" and insert -- PNP --, therefor.

In Fig. 4, Sheet 4 of 6, for Tag "160", delete "PBP" and insert -- PNP --, therefor.

In Fig. 4, Sheet 4 of 6, for Tag "162", delete "PBP" and insert -- PNP --, therefor.

In Fig. 5, Sheet 5 of 6, for Tag "122", delete "PBP" and insert -- PNP --, therefor.

In Fig. 5, Sheet 5 of 6, for Tag "124", delete "PBP" and insert -- PNP --, therefor.

In Fig. 5, Sheet 5 of 6, for Tag "160", delete "PBP" and insert -- PNP --, therefor.

In Fig. 5, Sheet 5 of 6, for Tag "162", delete "PBP" and insert -- PNP --, therefor.

Signed and Sealed this  
Twenty-ninth Day of April, 2014

Michelle K. Lee  
*Deputy Director of the United States Patent and Trademark Office*

CERTIFICATE OF CORRECTION (continued)

In the Specifications:

In Column 1, Line 37, delete "(SON ET)" and insert -- (SONET) --, therefor.

In Column 1, Line 47, delete "IEEEE" and insert -- IEEE --, therefor.

In Column 1, Line 67, delete "PRB-TE." and insert -- PBB-TE. --, therefor.

In Column 3, Line 57, delete "art or" and insert -- art of --, therefor.

In Column 3, Line 67, delete "(CFM)." and insert -- (CFM), --, therefor.

In Column 4, Line 3, delete "embodiment;" and insert -- embodiment, --, therefor.

In Column 5, Line 22, delete "ABB-TE" and insert -- PBB-TE --, therefor.

In Column 5, Line 39, delete "PBB TE" and insert -- PBB-TE --, therefor.

In Column 5, Line 42, delete "ABB-TE" and insert -- PBB-TE --, therefor.

In Column 5, Line 61, delete "CAP 126" and insert -- CBP 126 --, therefor.

In Column 5, Line 62, delete "West." and insert -- West --, therefor.

In Column 5, Line 62, delete "CPB 164" and insert -- CBP 164 --, therefor.

In Column 5, Line 66, delete "CPB 164" and insert -- CBP 164 --, therefor.

In Column 6, Line 9, delete "CPB 164" and insert -- CBP 164 --, therefor.

In Column 6, Line 14, delete "CPB 164" and insert -- CBP 164 --, therefor.

In Column 6, Line 39, delete "Roth" and insert -- Both --, therefor.

In Column 6, Line 58, delete "(1-SID)" and insert -- (I-SID) --, therefor.

In Column 6, Line 62, delete "ABB-TE" and insert -- PBB-TE --, therefor.

In Column 6, Line 65, delete "ABS-TE" and insert -- PBB-TE --, therefor.

In Column 7, Lines 10-11, delete "(3.5*CCMinterval" and insert -- (3.5*CCMinterval) --, therefor.

In Column 7, Line 20, delete "misconliguration" and insert -- misconfiguration --, therefor.

In Column 8, Line 18, delete "(3.5*CCMinterval" and insert -- (3.5*CCMinterval) --, therefor.

In Column 8, Lines 19-20, delete "(3.5*CCM interval)" and insert -- (3.5*CCMinterval) --, therefor.

In Column 8, Line 24, delete "protection." and insert -- protection --, therefor.